US011612971B2

(12) United States Patent
Dong et al.

(10) Patent No.: US 11,612,971 B2
(45) Date of Patent: *Mar. 28, 2023

(54) APPARATUS AND METHOD FOR ASSEMBLING OPTICAL MODULE

(71) Applicant: GOER OPTICAL TECHNOLOGY CO., LTD., Shandong (CN)

(72) Inventors: Nanjing Dong, Weifang (CN); Debo Sun, Weifang (CN)

(73) Assignee: GOER OPTICAL TECHNOLOGY CO., LTD., Weifang (CN)

( * ) Notice: Subject to any disclaimer, the term of this patent is extended or adjusted under 35 U.S.C. 154(b) by 225 days.

This patent is subject to a terminal disclaimer.

(21) Appl. No.: 16/753,310

(22) PCT Filed: Sep. 6, 2018

(86) PCT No.: PCT/CN2018/104389
§ 371 (c)(1),
(2) Date: Apr. 2, 2020

(87) PCT Pub. No.: WO2019/076161
PCT Pub. Date: Apr. 25, 2019

(65) Prior Publication Data
US 2020/0238455 A1 Jul. 30, 2020

(30) Foreign Application Priority Data
Oct. 17, 2017 (CN) .......................... 201710965647.1

(51) Int. Cl.
*B23P 19/10* (2006.01)
*G02B 7/02* (2021.01)
(Continued)

(52) U.S. Cl.
CPC ............... *B23P 19/10* (2013.01); *B23P 15/00* (2013.01); *G02B 7/023* (2013.01); *G02B 27/62* (2013.01);
(Continued)

(58) Field of Classification Search
CPC ........ B23P 19/105; B23P 15/00; G02B 7/023; G02B 7/02; G02B 7/04; G02B 7/003;
(Continued)

(56) References Cited

U.S. PATENT DOCUMENTS

| 11,079,221 B2* | 8/2021 | Dong | ...................... G02B 7/025 |
| 2005/0212951 A1* | 9/2005 | Miyata | ...................... G02B 7/04 |
| | | | 348/E5.045 |
| 2020/0292837 A1* | 9/2020 | Dong | ................... H04N 9/3129 |

FOREIGN PATENT DOCUMENTS

| CN | 1685707 A | 10/2005 |
| CN | 101493562 A | 7/2009 |

(Continued)

OTHER PUBLICATIONS

Written Opinion of the International Searching Authority for International Application No. PCT/CN2018/104389 (Year: 2020).*

(Continued)

*Primary Examiner* — Christopher J Besler
(74) *Attorney, Agent, or Firm* — Maschoff Brennan

(57) ABSTRACT

An apparatus and a method for assembling optical module is provided and the method includes: controlling an alignment mechanism holding a to-be-assembled lens to move at a preset step-size in a preset direction when an optical module to be aligned generates an image; collecting light spots of the images generated by an optical module to be aligned sequentially by an image collecting means, each time the alignment mechanism moves; selecting a light spot with a minimum size from the collected light spots, and determining a move- (Continued)

ment position of the alignment mechanism when the light spot with the minimum size is collected, as an optimal position; controlling the alignment mechanism to move to the optimal position to align the to-be-assembled lens.

4 Claims, 6 Drawing Sheets

(51) Int. Cl.
    *G02B 27/62*     (2006.01)
    *B23P 15/00*     (2006.01)
    *G02B 7/04*     (2021.01)
    *G02B 27/12*     (2006.01)
    *G01B 11/27*     (2006.01)
    *B23P 19/04*     (2006.01)
    *G02B 7/00*     (2021.01)
    *G02B 27/10*     (2006.01)

(52) U.S. Cl.
    CPC ............... *B23P 19/04* (2013.01); *G01B 11/27* (2013.01); *G02B 7/003* (2013.01); *G02B 7/004* (2013.01); *G02B 7/005* (2013.01); *G02B 7/02* (2013.01); *G02B 7/04* (2013.01); *G02B 27/1073* (2013.01); *G02B 27/123* (2013.01)

(58) Field of Classification Search
    CPC ...... G02B 7/004; G02B 7/005; G02B 27/123; G02B 27/62; G02B 27/1073; B01B 11/27; G06T 7/70; G01M 11/0221
See application file for complete search history.

(56) References Cited

FOREIGN PATENT DOCUMENTS

| CN | 101592787 A | 12/2009 |
|---|---|---|
| CN | 201974587 U | 9/2011 |
| CN | 102780847 A | 11/2012 |
| CN | 103674839 A | 3/2014 |
| CN | 105721753 A | 6/2016 |
| CN | 107589513 A | 1/2018 |
| KR | 20090065854 A | 7/2009 |

OTHER PUBLICATIONS

CN Office Action dated Apr. 26, 2019 as received in Application No. 201710965647.1.
CN Office Action dated Jan. 1, 2020 as received in Application No. 201710965647.1.

\* cited by examiner controlling an alignment mechanism holding a to-be-assembled lens to move at a preset step-size in a preset direction when an optical module to be aligned generates an image ~ 101 collecting light spots of the images generated by an optical module to be aligned sequentially by an image collecting means, each time the alignment mechanism moves ~ 102 selecting a light spot with a minimum size from the collected light spots, and determining a movement position of the alignment mechanism when the light spot with the minimum size is collected, as an optimal position ~ 103 controlling the alignment mechanism to move to the optimal position to align the to-be-assembled lens ~ 104

*FIG 1*

```
┌─────────────────────────────────────────────────────────────┐
│ controlling the alignment mechanism to place the to-be-assembled lens at a │
│ designated position of a to-be-assembled optical part to obtain an optical module to │
│                         be aligned                          │
└─────────────────────────────────────────────────────────────┘ — 201
                              ▼
┌─────────────────────────────────────────────────────────────┐
│ controlling a power supply to supply power to a light source inside the optical │
│ module to be aligned or to an external light source located on the object side of the │
│ optical module to be aligned, so that the optical module to be aligned generates │
│                          images                             │
└─────────────────────────────────────────────────────────────┘ — 202
                              ▼
┌─────────────────────────────────────────────────────────────┐
│ controlling the alignment mechanism holding the to-be-assembled lens at a preset │
│     step-size in a preset direction when the optical module to be aligned │
└─────────────────────────────────────────────────────────────┘ — 203
                              ▼
┌─────────────────────────────────────────────────────────────┐
│ collecting a light spot of images generated by the optical module to be aligned │
│  sequentially by the image collecting means each time the alignment mechanism │
│                          moves                              │
└─────────────────────────────────────────────────────────────┘ — 204
                              ▼
┌─────────────────────────────────────────────────────────────┐
│     selecting a light spot with minimum size from the collected light spots │
└─────────────────────────────────────────────────────────────┘ — 205
                              ▼
┌─────────────────────────────────────────────────────────────┐
│          performing repetitive verifying on the light spot with minimum size │
└─────────────────────────────────────────────────────────────┘ — 206
                              ▼
┌─────────────────────────────────────────────────────────────┐
│ determining the movement position of the alignment mechanism when the light │
│ spot with minimum size is collected as the optimal position when the light spot │
│               with minimum size passes the verifying        │
└─────────────────────────────────────────────────────────────┘ — 207
                              ▼
┌─────────────────────────────────────────────────────────────┐
│ controlling the alignment mechanism to move to the optimal position to align the │
│                     to-be-assembled lens                    │
└─────────────────────────────────────────────────────────────┘ — 208
                              ▼
┌─────────────────────────────────────────────────────────────┐
│  fixing the to-be-assembled lens and the to-be-assembled optical part after the │
│               alignment to obtain the optical module        │
└─────────────────────────────────────────────────────────────┘ — 209
```

*FIG 2a*

APPARATUS AND METHOD FOR ASSEMBLING OPTICAL MODULE

CROSS-REFERENCE TO RELATED APPLICATIONS

This application claims priority to Chinese Patent Application No. 201710965647.1, filed Oct. 17, 2017, entitled "Apparatus and Method for Assembling Optical Module", which is hereby incorporated by reference in its entirety.

TECHNICAL FIELD

The present disclosure relates to a field of assembling, and particularly relates to an apparatus and a method for assembling optical module.

BACKGROUND

Nowadays, there are more and more optical modules with independent functions in the market to meet diversified market demands. These optical modules may be embedded into other devices to perform their functions, such as camera modules, micro-projection modules, LED (Light Emitting Diode) optical modules, and VR (Virtual Reality)/AR (Augmented Reality) optical modules.

Generally, an optical module is obtained by assembling a plurality of optical elements and other parts. For example, a camera module may be obtained by assembling components such as image sensors, lens mounts, a plurality of lenses, and circuit boards. More particularly, an accuracy in assembling the lens plays a decisive role in an optical performance of an optical module. In a method for assembling optical module, an image is obtained with respect to the optical module in the process of assembling, and analyzing is performed to determine whether the lenses are aligned according to the sizes of imaging light spots, and the position of the to-be-assembled lenses are constantly adjusted in a case that the to-be-assembled lenses are not aligned.

However, there is still a technical problem that how to adjust the to-be assembled lenses to the most reasonable position according to a size of imaging light spot of an optical module in the process of assembling.

BRIEF SUMMARY

In view of this, the present disclosure provides an apparatus and a method for assembling optical module to adjust the to-be assembled lenses to the most reasonable position according to a size of imaging light spot of an optical module in the process of assembling, and thus to improve the accuracy in assembling optical modules.

In one embodiment of the present disclosure, a method for assembling optical module is provided. The method includes:

controlling an alignment mechanism holding a to-be-assembled lens to move at a preset step-size in a preset direction when an optical module to be aligned generates an image;

collecting light spots of the images generated by an optical module to be aligned sequentially by an image collecting means, each time the alignment mechanism moves;

selecting a light spot with a minimum size from the collected light spots, and determining a movement position of the alignment mechanism when the light spot with the minimum size is collected, as an optimal position; controlling the alignment mechanism to move to the optimal position to align the to-be-assembled lens.

In some embodiments, the selecting a light spot with a minimum size from the collected light spots including: determining that a first light spot is the light spot with the minimum size, if sizes of a first amount of light spots before the first light spot are all larger than the size of the first light spot, and sizes of a second amount of light spots after the first light spot are all smaller than the size of the first light spot.

In some embodiments, the controlling an alignment mechanism holding a to-be-assembled lens to move at a preset step-size in a preset direction includes:

controlling the alignment mechanism to move from a head end or a tail end of an assembling area corresponding to the to-be-assembled lens at a preset step-size in a preset direction.

In some embodiments, before the determining a movement position of the alignment mechanism when the light spot with the minimum size is collected, as an optimal position, the method further includes: using a movement position of the alignment mechanism when the light spot with the minimum size is collected as a suspicious position; controlling the alignment mechanism to move to the suspicious position and a preset amount of movement positions before and after the suspicious position, and collecting, by the image collecting means, a light spot of an image generated by the optical module to be aligned at each movement sequentially; using the suspicious position as the optimal position, if a size of a light spot collected when the alignment mechanism moves to the suspicious position among the light spots of images generated by the optical module to be aligned at each movement has the minimum size.

In some embodiments, before the optical module to be aligned generates an image, the method further includes: controlling the alignment mechanism to place the to-be-assembled lens at a designated position of a to-be-assembled optical part to obtain an optical module to be aligned; controlling a power supply to supply power to a light source inside the optical module to be aligned or to an external light source located on the object side of the optical module to be aligned, so that the optical module to be aligned generates images.

The invention also provides an apparatus for assembling optical module, including: a movement module, configured to control an alignment mechanism holding a to-be-assembled lens to move at a preset step-size in a preset direction when an optical module to be aligned generates an image;

an image collecting means, configured to collect light spots of the images generated by an optical module to be aligned sequentially, each time the alignment mechanism moves;

an optimal position selecting module, configured to select a light spot with a minimum size from the collected light spots, and determine a movement position of the alignment mechanism when the light spot with the minimum size is collected, as an optimal position;

an alignment module, configured to control the alignment mechanism to move to the optimal position to align the to-be-assembled lens.

In some embodiments, the optimal position selecting module further configured to determine that a first light spot is the light spot with the minimum size, if sizes of a first amount of light spots before the first light spot are all larger than the size of the first light spot, and sizes of a second amount of light spots after the first light spot are all smaller than the size of the first light spot.

In some embodiments, the movement module further configured to control the alignment mechanism to move from a head end or a tail end of an assembling area corresponding to the to-be-assembled lens at a preset step-size in a preset direction.

In some embodiments, the apparatus further includes an optimal position correcting module, configured to use a movement position of the alignment mechanism when the light spot with the minimum size is collected as a suspicious position; control the alignment mechanism to move to the suspicious position and a preset amount of movement positions before and after the suspicious position, and collect, by the image collecting means, a light spot of an image generated by the optical module to be aligned at each movement sequentially; use the suspicious position as the optimal position, if a size of a light spot collected when the alignment mechanism moves to the suspicious position among the light spots of images generated by the optical module to be aligned at each movement has the minimum size.

In some embodiments, the apparatus further includes a preprocessing module, configured to control the alignment mechanism to place the to-be-assembled lens at a designated position of a to-be-assembled optical part to obtain an optical module to be aligned; control a power supply to supply power to a light source inside the optical module to be aligned or to an external light source located on the object side of the optical module to be aligned, so that the optical module to be aligned generates images.

In the present invention, during the process of assembling the optical module, when the optical module to be aligned generates images, the alignment mechanism holding a to-be-assembled lens is controlled to constantly move to find a light spot with a minimum size of the image, and the to-be-assembled lens is adjusted to an optimal position based on a movement position of the alignment mechanism when the light spot with the minimum size is collected. Therefore, a search for the optimal position of the to-be-assembled lens is turned into a search for a light spot with a minimum size of the image with respect to the optical module to be assembled, which reduces the difficulty in aligning the to-be-assembled lens and improves the accuracy for assembling the optical module.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

BRIEF DESCRIPTION OF THE DRAWINGS

Drawings needed in the description of the embodiments and the prior art shall be explained below, so as to explain the technical solutions in the embodiments of the present disclosure and the prior art more clearly. It is obvious that the drawings explained below are merely some embodiments of the present disclosure, and a person of ordinary skill in the art may obtain other drawings according to these drawings without making an inventive effort.

FIG. 1 is a schematic structural diagram of a method for assembling optical module according to an embodiment of the present disclosure;

FIG. 2a is a schematic structural diagram of a method for assembling optical module according to another embodiment of the present disclosure;

DETAILED DESCRIPTION

Figure 2B:
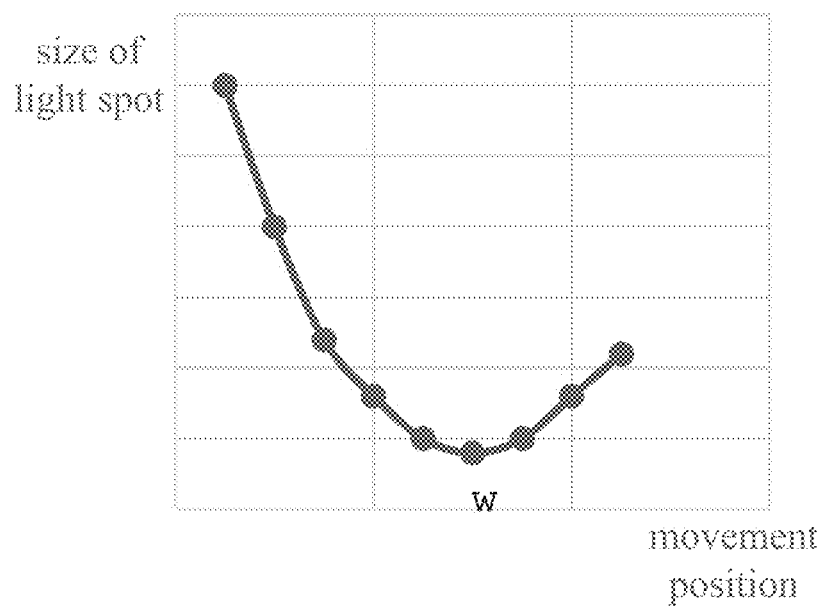
FIG. 2b is a schematic diagram of selecting a light spot with a minimum size provided by the present disclosure.

In order to make the objectives, technical solutions, and advantages of the embodiments of the present disclosure clearer, the technical solutions in the embodiments of the present disclosure will be clearly and completely described with reference to the drawings in the embodiments of the present disclosure. Obviously, the described embodiments are some of the embodiments of the present disclosure, not all of the embodiments. Based on the embodiments in the present disclosure, all other embodiments obtained by one skilled in the art without making creative efforts shall fall within the protection scope of the present disclosure.

It should be noted that, in the following embodiments of the present disclosure, an optical module refers to a complete product with the alignment completed and the fixing completed; an optical module to be aligned refers to an optical module in the assembly process, which may be in a state of being unaligned or aligned; a to-be-assembled optical part refers to the semi-finished product of an optical module, and the to-be-assembled lenses needs to be aligned and assembled at its designated position and fixed to obtain an optical module. The above-mentioned concepts mentioned below may be understood with reference to the above explanations, and detailed may be omitted to avoid redundancy.

In a method for assembling optical module, an optical module may generate images during the process of assembling, and analyzing may be made according to a size of imaging light spot to determine whether or not the to-be-assembled lens has been aligned, and a position of the to-be-assembled lens may be constantly adjusted in a case that the to-be-assembled lens is not aligned. The main point of the embodiments of the present disclosure is to propose a method for adjusting the position of the to-be-assembled lens to an optimal position so as to obtain an optical module with a high assembling accuracy. Detailed description would be made on the technical solutions proposed by the present disclosure with reference to FIGs.

FIG. 1 is a schematic structural diagram of a method for assembling optical module according to an embodiment of the present disclosure. With reference to FIG. 1, the method includes:

Step 101, controlling an alignment mechanism holding a to-be-assembled lens to move at a preset step-size in a preset direction when an optical module to be aligned generates an image.

Step 102, collecting light spots of the images generated by an optical module to be aligned sequentially by an image collecting means, each time the alignment mechanism moves.

Step 103, selecting a light spot with a minimum size from the collected light spots, and determining a movement position of the alignment mechanism when the light spot with the minimum size is collected, as an optimal position.

Step 104, controlling the alignment mechanism to move to the optimal position to align the to-be-assembled lens.

In the step 101, the alignment mechanism may generally include a robot arm and an aligning head on the robot arm. The robot arm may be configured to move according to a preset movement track, and the aligning head may be a vacuum chuck or a mechanical clamp, and configured to hold a to-be-assembled lens.

The optical module to be aligned includes a to-be-assembled optical part and a to-be-assembled lens. The alignment mechanism may place the to-be-assembled lens at a designated position of the to-be-assembled optical part, and the designated position may not be a position where the optical module can achieve the best optical performance Therefore, the alignment mechanism may carry the to-be-assembled lens and constantly move around a designated position to adjust the to-be-assembled lens to an optimal position. It should be understood that the optimal position may optimize the optical performance of the optical module.

When the alignment mechanism carries the to-be-assembled lens and moves constantly, the alignment mechanism may be configured to move move at a preset step-size in a preset direction, in order to find a possible regulation of the result brought by its movement. In some embodiments, the preset step-size may be a movement distance corresponding to each movement, e.g., 2 mm; the movement direction may be a forward direction or a backward direction.

In the step 103, the image collecting means may collect a plurality of light spots with different sizes after many movements of the alignment mechanism. According to the optics imaging principle, when the size of light spot size is the smallest, the energy of the light is most concentrated, the imaging is the clearest, and the assembled optical module has the best performance. Therefore, a light spot with minimum size may be searched for from a plurality of light spots with different sizes collected by the image collecting means, and the movement position of the alignment mechanism when the light spot with minimum size is found is used as the optimal position.

In the step 104, the alignment mechanism may be controlled to move to the optimal position upon the optimal position is determined so as to achieve the alignment of the to-be-assembled lens.

In the embodiments of the present disclosure, during the process of assembling the optical module, when the optical module to be aligned generates images, the alignment mechanism holding a to-be-assembled lens is controlled to constantly move to find a light spot with a minimum size of the image, and the to-be-assembled lens is adjusted to an optimal position based on a movement position of the alignment mechanism when the light spot with the minimum size is collected. Therefore, a search for the optimal position of the to-be-assembled lens is turned into a search for a light spot with a minimum size of the image with respect to the optical module to be assembled, which reduces the difficulty in aligning the to-be-assembled lens and improves the accuracy for assembling the optical module.

FIG. 2a is a schematic structural diagram of a method for assembling optical module according to another embodiment of the present disclosure. With reference to FIG. 2, the method includes:

Step 201, controlling the alignment mechanism to place the to-be-assembled lens at a designated position of a to-be-assembled optical part to obtain an optical module to be aligned.

Step 202, controlling a power supply to supply power to a light source inside the optical module to be aligned or to an external light source located on the object side of the optical module to be aligned, so that the optical module to be aligned generates images.

Step 203, controlling the alignment mechanism holding the to-be-assembled lens at a preset step-size in a preset direction when the optical module to be aligned.

Step 204, collecting a light spot of images generated by the optical module to be aligned sequentially by the image collecting means each time the alignment mechanism moves.

Step 205, selecting a light spot with minimum size from the collected light spots.

Step 206, performing repetitive verifying on the light spot with minimum size.

Step 207, determining the movement position of the alignment mechanism when the light spot with minimum size is collected as the optimal position when the light spot with minimum size passes the verifying.

Step 208, controlling the alignment mechanism to move to the optimal position to align the to-be-assembled lens.

Step 209, fixing the to-be-assembled lens and the to-be-assembled optical part after the alignment to obtain the optical module.

In the step 201, the to-be-assembled optical part is generally fixed on a fixture, and its positional accuracy may be determined by the fixture. The designated position may be a position calculated according to hardware parameters of the to-be-assembled optical part and to-be-assembled lens and a requirement on optical performance of the optical module, but such designated position may be not a position where the optical module may achieve the optimal optical performance.

In the step 202, in the embodiments of the present disclosure, the to-be-assembled lens may be aligned according to the practical imaging effect of the optical module to be aligned. Therefore, it is necessary for the optical module to generate images during the process of alignment.

In some embodiments, in some optical modules, such as a micro-projection module, which has a light source inside thereof, the power supply may supply power to such light source so that the optical module to be aligned may generate images. In some other optical modules, such as camera modules, which has no light source inside, and thus an external light source may be provided on the object side of the optical module to be aligned, and the power supply may supply power to such light source so that the optical module to be aligned may generate images.

In the step 203, in some embodiments, in order to prevent an optimal position from being missed, the alignment mechanism may move from a head end or a tail end of an assembling area corresponding to the to-be-assembled lens. More particularly, the assembling area corresponding to the to-be-assembled lens may be an area around the designated position cited in the step 201, e.g., an area with a distance of ±5 mm from the designated position. Therefore, the alignment mechanism may start its movement from a position of 5 mm ahead of the designated position or from a position of 5 mm behind the designated position at a preset step-size in a preset direction.

In the step 204, the image collecting means may be controlled to collect a light spot of images generated by the optical module to be aligned sequentially with respect to each movement of the alignment mechanism.

In the step 205, the image collecting means may collect a plurality of light spots when the alignment mechanism moves many times. In some embodiments, searching may be performed in the plurality of light spots so as to find a first light spot meeting a preset condition as the light spot with a minimum size. More particularly, the preset condition may be as follows:

The sizes of a first amount of light spots before the first light spot are all larger than the size of the first light spot, and sizes of a second amount of light spots after the first light spot are all smaller than the size of the first light spot. More particularly, the first light spot refers to a light spot meeting the preset condition, and the expression of "first" may be merely to facilitate the description of light spot without limitation on the collecting sequence of the light spots. The first amount and the second amount may be equal or unequal to each other. Normally, the first amount may be determined according to the practical movement, and the second amount may be have a value in a range of 1 to 5. There is no limitation on the amount in the embodiments of the present disclosure. As shown in FIG. 2b, five light spots before the light spot P are all bigger than the light spot P, and three light spots behind the light spot P are all larger than the light spot. Therefore, the light spot P may be determined as the light spot with minimum size.

It should be noted that, in some embodiments, when a first spot may be determined as the light spot with minimum size according to the second amount of light spots, the alignment mechanism may not keep moving in a preset direction any longer, and thus the efficiency in finding the light spot with minimum size may be improved.

In the step 206, upon determining the light spot with minimum size, to ensure the accuracy, repetitive verifying may be performed on the light spot with minimum size.

In some embodiments, during the repetitive verifying, the movement position of the alignment mechanism when the light spot with minimum size is collected may be used as a suspicious position, the alignment mechanism may be controlled to move to the suspicious position and a preset amount of movement positions before and after the suspicious position, and the image collecting means may collect a light spot of an image generated by the optical module to be aligned at each movement sequentially. More particularly, the preset amount may be determined according practical situation and there is no limitation on the amount in the embodiments of the present disclosure.

In the step 207, if a size of a light spot collected when the alignment mechanism moves to the suspicious position among the light spots of images generated by the optical module to be aligned at each movement has the minimum size, it may be determined that the light spot with minimum size has been accurately collected and the suspicious position may be used as the optimal position.

In the step 208, the alignment mechanism may be controlled to move to the optimal position to align the to-be-assembled lens when the optimal position is determined.

In the step 209, the to-be-assembled lens and the to-be-assembled optical part may be fixed after the alignment to obtain the optical module.

In some embodiments, dispensing may be performed at a specific position of the to-be-assembled optical part in advance before the to-be-assembled lens is aligned, so as to cure the pre-dispensed glue directly after the alignment to fix the to-be-assembled lens and the to-be-assembled optical part. In some embodiments, dispensing and curing may be performed at a specific position of the to-be-assembled optical part after the to-be-assembled lens is aligned, so as to fix the to-be-assembled lens and the to-be-assembled optical part.

In some embodiments, UV (Ultraviolet Rays) glue may be used, i.e., shadowless glue, also known as photosensitive glue or ultraviolet curing glue, which has high adhesion and may be cured rapidly, which may indirectly improve the efficiency in assembling optical modules. In the stage of curing, a UV lamp may be used to irritate at the dispensing position so as to accelerate the curing.

In the embodiments of the present disclosure, during the process of assembling the optical module, when the optical module to be aligned generates images, the alignment mechanism holding a to-be-assembled lens is controlled to constantly move to find a light spot with a minimum size of the image, and the to-be-assembled lens is adjusted to an optimal position based on a movement position of the alignment mechanism when the light spot with the minimum size is collected. Therefore, a search for the optimal position of the to-be-assembled lens is turned into a search for a light spot with a minimum size of the image with respect to the optical module to be assembled, which reduces the difficulty in aligning the to-be-assembled lens and improves the accuracy for assembling the optical module. In addition, repetitive verifying may be performed on the light spot with minimum size when searching for the light spot with minimum size so as to further improve the accuracy in assembling the optical module.

Figure 3A:
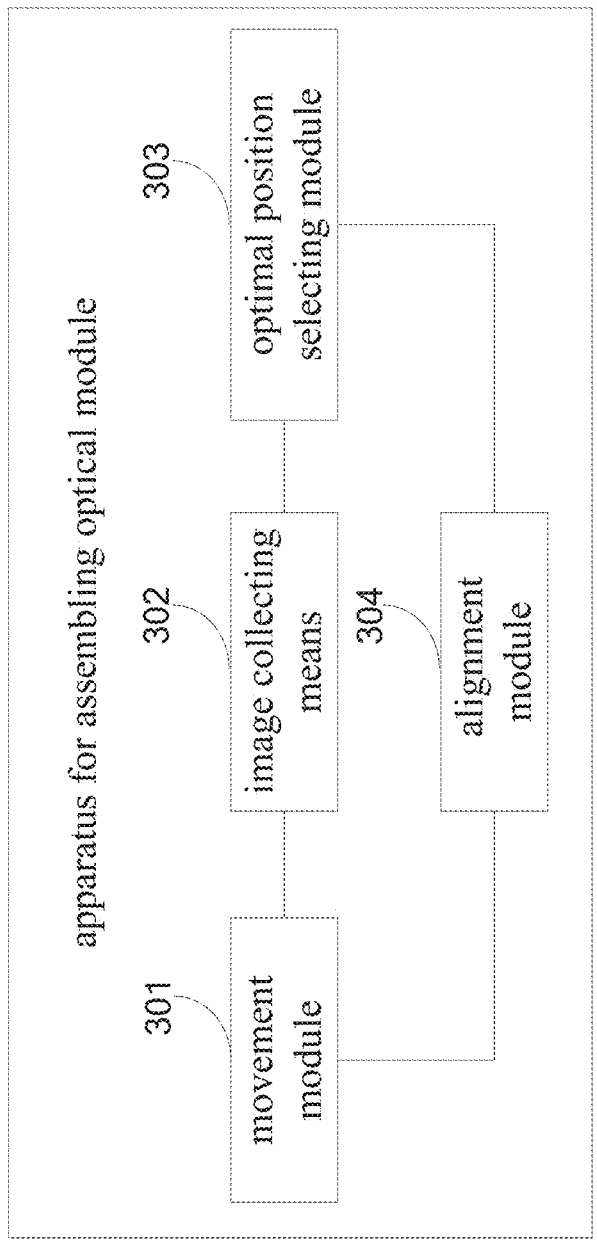
FIG. 3a is a schematic structural diagram of an apparatus for assembling optical module according to another embodiment of the present disclosure.

FIG. 3a is a schematic structural diagram of an apparatus for assembling optical module according to another embodiment of the present disclosure. The apparatus includes:

a movement module 301, configured to control an alignment mechanism holding a to-be-assembled lens to move at a preset step-size in a preset direction when an optical module to be aligned generates an image;

an image collecting means 302, configured to collect light spots of the images generated by an optical module to be aligned sequentially, each time the alignment mechanism moves;

an optimal position selecting module 303, configured to select a light spot with a minimum size from the collected light spots, and determine a movement position of the alignment mechanism when the light spot with the minimum size is collected, as an optimal position;

an alignment module 304, configured to control the alignment mechanism to move to the optimal position to align the to-be-assembled lens.

In some embodiments, the optimal position selecting module 303 further configured to determine that a first light spot is the light spot with the minimum size, if sizes of a first amount of light spots before the first light spot are all larger than the size of the first light spot, and sizes of a second amount of light spots after the first light spot are all smaller than the size of the first light spot.

In some embodiments, the movement module 301 further configured to control the alignment mechanism to move from a head end or a tail end of an assembling area corresponding to the to-be-assembled lens at a preset step-size in a preset direction.

Figure 3B:
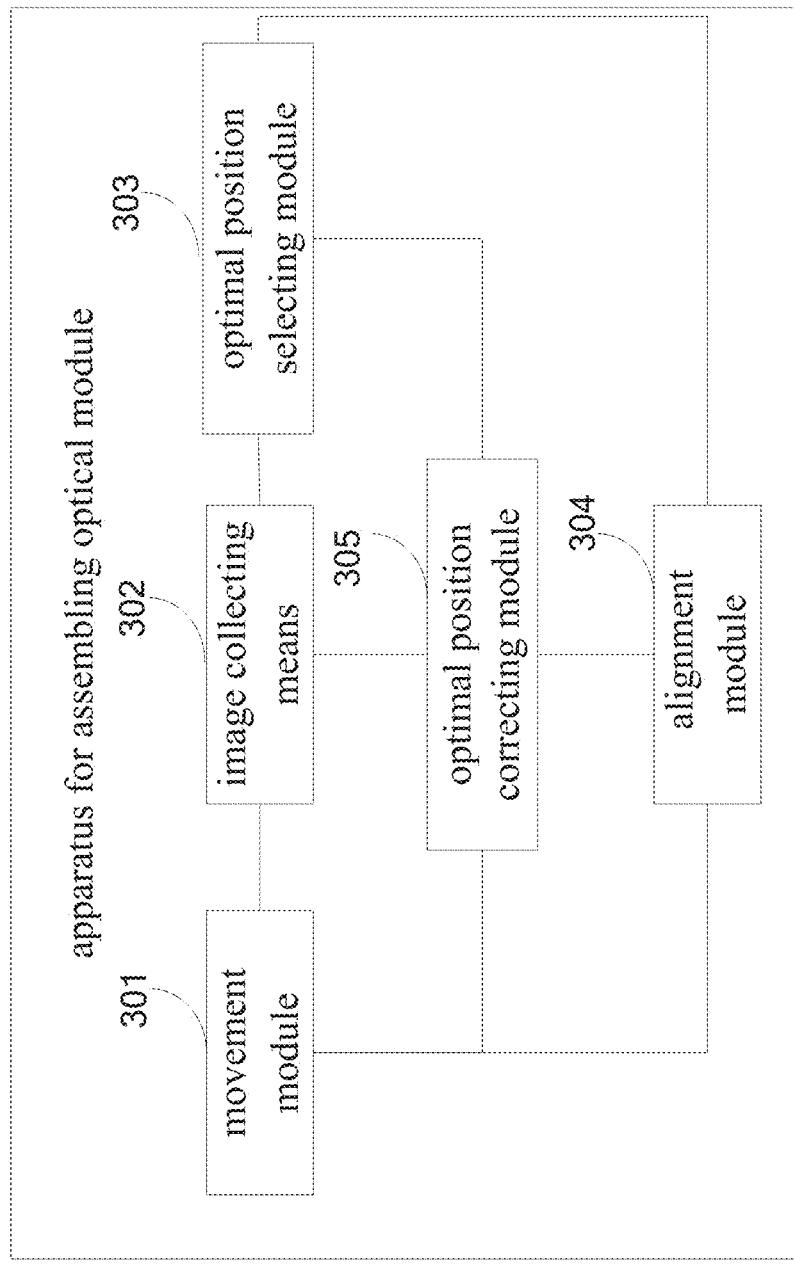
FIG. 3b is a schematic structural diagram of an apparatus for assembling optical module according to another embodiment of the present disclosure.

In some embodiments, as shown in FIG. 3b, the apparatus further includes an optimal position correcting module 305, configured to use a movement position of the alignment mechanism when the light spot with the minimum size is collected as a suspicious position; control the alignment mechanism to move to the suspicious position and a preset amount of movement positions before and after the suspicious position, and collect, by the image collecting means, a light spot of an image generated by the optical module to be aligned at each movement sequentially; use the suspicious position as the optimal position, if a size of a light spot collected when the alignment mechanism moves to the suspicious position among the light spots of images generated by the optical module to be aligned at each movement has the minimum size.

Figure 3C:
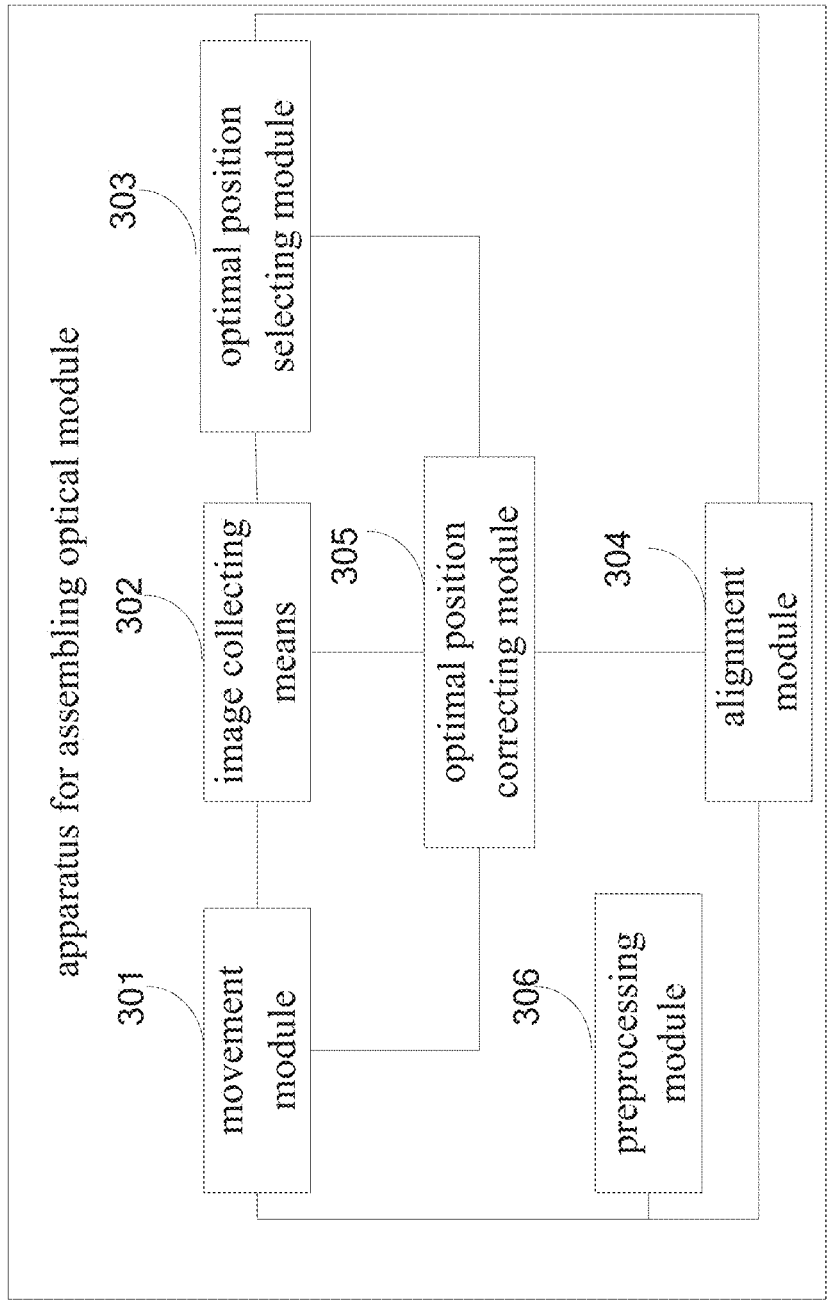
FIG. 3c is a schematic structural diagram of an apparatus for assembling optical module according to another embodiment of the present disclosure.

In some embodiments, as shown in FIG. 3c, the apparatus further includes a preprocessing module 306, configured to control the alignment mechanism to place the to-be-assembled lens at a designated position of a to-be-assembled optical part to obtain an optical module to be aligned; control a power supply to supply power to a light source inside the optical module to be aligned or to an external light source located on the object side of the optical module to be aligned, so that the optical module to be aligned generates images.

In the present invention, during the process of assembling the optical module, when the optical module to be aligned generates images, the alignment mechanism holding a to-be-assembled lens is controlled to constantly move to find a light spot with a minimum size of the image, and the to-be-assembled lens is adjusted to an optimal position based on a movement position of the alignment mechanism when the light spot with the minimum size is collected. Therefore, a search for the optimal position of the to-be-assembled lens is turned into a search for a light spot with a minimum size of the image with respect to the optical module to be assembled, which reduces the difficulty in aligning the to-be-assembled lens and improves the accuracy for assembling the optical module.

It should be noted that the expressions, such as "first" and "second" in the present disclosure are used to distinguish different messages, devices, modules, etc., and do not represent the sequence, nor do they limit "first" and "second" as different types.

It should also be noted that the terms of "including", "containing" or any other variation thereof are intended to encompass non-exclusive inclusions, so that a product or system that includes a series of elements includes not only those elements but also other elements that are not explicitly listed, or elements that are inherent to this commodity or system. Without much limitation, the elements defined by the expression of "including a . . . " does not exclude the existence of other same elements in the product or system including elements as stated.

The above embodiments are only used to describe the technical solution of the present disclosure, and are not limited thereto. Although the present disclosure has been described in detail with reference to the foregoing embodiments, the skilled in the art should understand that they can still modify the technical solutions described in the foregoing embodiments, or equivalently replace some of the technical features thereof. These modifications or replacements do not deviate the essence of the corresponding technical solutions from the spirit and scope of the technical solutions of the embodiments of the present disclosure.

The invention claimed is:

1. An method for assembling optical module, comprising:
controlling an alignment mechanism holding a to-be-assembled lens to move at a preset step-size in a preset direction when an optical module to be aligned generating an image, wherein the alignment mechanism comprises a robot arm having a vacuum chuck or a mechanical clamp;
collecting, sequentially, a light spot of the image generated by the optical module to be aligned by an image collector upon each movement of the alignment mechanism;
selecting a light spot with a minimum size from collected light spots, and determining a movement position of the alignment mechanism when the light spot with the minimum size is collected, as an optimal position; and
controlling the alignment mechanism to move to the optimal position to align the to-be-assembled lens;
wherein the selecting a light spot with a minimum size from the collected light spots comprises: determining that a first light spot is the light spot with the minimum size, if and only if sizes of a first amount of light spots in the collected light spots collected before the first light spot are all larger than the size of the first light spot, and sizes of a second amount of light spots in the collected light spots collected after the first light spot are all larger than the size of the first light spot.

2. The method according to claim 1, wherein the controlling an alignment mechanism holding a to-be-assembled lens to move at a preset step-size in a preset direction comprises: controlling the alignment mechanism to move from a head end or a tail end of an assembling area corresponding to the to-be-assembled lens at the preset step-size in the preset direction.

3. The method according to claim 1, wherein before the determining a movement position of the alignment mechanism when the light spot with the minimum size is collected, as an optimal position, the method further comprises:
using the movement position of the alignment mechanism when the light spot with the minimum size is collected as a suspicious position;
controlling the alignment mechanism to move to the suspicious position and a preset amount of movement positions before and after the suspicious position, and collecting, by the image collector, the light spot of the image generated by the optical module to be aligned at each movement sequentially;
using the suspicious position as the optimal position, if a size of a light spot collected when the alignment mechanism moves to the suspicious position has the minimum size than other collected light spots.

4. The method according to claim 1, wherein before the optical module to be aligned generates an image, the method further comprises:
controlling the alignment mechanism to place the to-be-assembled lens at a designated position of a to-be-assembled optical part to obtain an optical module to be aligned;
controlling a power supply to supply power to a light source inside the optical module to be aligned or to an external light source located on the object side of the optical module to be aligned, so that the optical module to be aligned generates images.

* * * * *